(12) United States Patent
Cheng (10) Patent No.: US 9,800,743 B2
(45) Date of Patent: Oct. 24, 2017

(54) IMAGE FORMING APPARATUS, METHOD FOR EXECUTING JOB, AND NON-TRANSITORY COMPUTER READABLE MEDIUM STORING INSTRUCTIONS FOR IMAGE FORMING APPARATUS

(71) Applicant: BROTHER KOGYO KABUSHIKI KAISHA, Nagoya-shi, Aichi-ken (JP)

(72) Inventor: Fei Cheng, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/063,876

(22) Filed: Mar. 8, 2016

(65) Prior Publication Data
US 2016/0337527 A1 Nov. 17, 2016

(30) Foreign Application Priority Data
May 12, 2015 (JP) .................................. 2015-097362

(51) Int. Cl.
*H04N 1/04* (2006.01)
*H04N 1/00* (2006.01)
*G06F 3/12* (2006.01)

(52) U.S. Cl.
CPC ............. *H04N 1/001* (2013.01); *G06F 3/121* (2013.01); *G06F 3/126* (2013.01); *G06F 3/1212* (2013.01); *G06F 3/1285* (2013.01); *H04N 1/00204* (2013.01); *G06F 3/1263* (2013.01); *H04N 2201/0094* (2013.01)

(58) Field of Classification Search
CPC ............... H04N 1/001; H04N 1/00204; H04N 2201/0094
USPC ................................ 358/1.15, 1.14, 1.9, 474
See application file for complete search history.

(56) References Cited

U.S. PATENT DOCUMENTS

| 6,285,843 | B1 * | 9/2001 | Obata | H04N 1/32609 399/82 |
| 2008/0309988 | A1 * | 12/2008 | Johnson | H04N 1/00209 358/462 |

FOREIGN PATENT DOCUMENTS

JP 2000-13545 A 1/2000

* cited by examiner

*Primary Examiner* — Houshang Safaipour
(74) *Attorney, Agent, or Firm* — Merchant & Gould P.C.

(57) ABSTRACT

An image forming apparatus includes a receiving unit which receives jobs, an image forming unit which forms an image on a sheet, a storage unit, and a controller. Each of the jobs is a first type job or a second type job. The first type job includes recipient-specific information that specifies a recipient of a sheet on which an image related to the first type job is formed, and the second type job does not include the recipient-specific information. In a case that a job is received by the receiving unit while not executing any job, the controller controls the image forming unit to form an image related to the job on a sheet. In a case that another job is received by the receiving unit while executing the job, the controller stores the another job in the storage unit.

9 Claims, 5 Drawing Sheets

| FIRST TYPE | SECOND TYPE |
|---|---|
| FACSIMILE JOB | IMAGE FORMATION JOB |
| E-MAIL JOB | COPY JOB |

IMAGE FORMING APPARATUS, METHOD FOR EXECUTING JOB, AND NON-TRANSITORY COMPUTER READABLE MEDIUM STORING INSTRUCTIONS FOR IMAGE FORMING APPARATUS

CROSS REFERENCE TO RELATED APPLICATION

The present application claims priority from Japanese Patent Application No. 2015-097362 filed on May 12, 2015, the disclosure of which is incorporated herein by reference in its entirety.

BACKGROUND

Field of the Invention

The present invention relates to an image forming apparatus, a method for executing jobs to be executed in the image forming apparatus, and a non-transitory computer readable medium storing instructions for the image forming apparatus.

Description of the Related Art

For instance, a network-compliant printer is connected to a Local Area Network (LAN). As the printer receives a job (PC print job) which is sent from a personal computer (PC) connected to the LAN, the job is executed in the printer, and an image related to the job is formed on a sheet.

In a case that, for instance, sheets to be used for the job run out while the job is being executed, the job is suspended. In this case, in a general printer, the job remains in a suspended state, until the sheets are replenished. Therefore, even when the printer receives another job newly, the job received newly is stored in a queue.

In view of this, the following method has been proposed. That is, in a case that sheets to be used for the job run out while the job is being executed, whether there is another job, for which another sheet having a size different from that of the sheet run out is to be used, is determined, and in a case that there is the another job (the another job is stored in the queue), the another job is executed upon interrupting the job (refer to Japanese Patent Application Laid-open Publication No. 2000-13545).

SUMMARY

A user who has sent a job from a PC to a printer, in many cases, goes to a location where the printer has been installed in a short time, to take a sheet on which an image related to the job has been formed. Moreover, for a job such as a copy job that is executed while the user is being in front of the printer, the user hardly moves away from the printer until the execution of the job is completed. In such a case when a recording material such as a sheet has run out during the execution of the job, the recording material is replenished by the user in front of the printer. Therefore, a possibility that the printer is left without the recording material being replenished is low. Nonetheless, when another job as mentioned above is executed upon interrupting, completion of the job sent by the user in front of the printer is delayed, and as a result, the user in front of the printer is made to wait.

An object of the present teaching is to provide an image forming apparatus, a method for executing job, and a non-transitory computer readable medium storing instructions for the image forming apparatus, which make it possible to execute a job rationally.

According to an aspect of the present teaching, there is provided an image forming apparatus including: a receiving unit configured to receive jobs; an image forming unit configured to form an image on a sheet; a storage unit; and a controller, wherein each of the jobs to be received by the receiving unit is a first type job or a second type job, the first type job including recipient-specific information that specifies a recipient of a sheet on which an image related to the first type job is formed, the second type job not including the recipient-specific information, in a case that a job is received by the receiving unit while not executing any job, the controller is configured to control the image forming unit to form an image related to the job on a sheet, in a case that another job is received by the receiving unit while executing the job, the controller is configured to store the another job in the storage unit, in a case that the controller determines that an image forming material necessary for image formation related to the first type job has run out while executing the first type job, the controller is configured to control the image forming unit to suspend image formation related to the first type job, and in a case that other jobs are stored in the storage unit and that the controller determines that another image forming material necessary for image formation related to the other jobs has not run out, the controller is configured to control the image forming unit to form an image, which is related to at least one job among the other jobs, on a sheet, and in a case that the controller determines that an image forming material necessary for image formation related to the second type job has run out while executing the second type job, the controller is configured to control the image forming unit to suspend image formation related to the second type job, and not to execute the other jobs even if the other jobs are stored in the storage unit.

According to such arrangement, the first type job is a job which includes the recipient-specific information that specifies a recipient of a sheet on which an image related to the first type job is formed. For such a job, a user who has inputted the job to the receiving unit, and a user who is the recipient of the sheet on which the image related to the job is formed, are different in many cases. Consequently, in a case that the image forming material necessary for image forming related to the first type job has run out during execution of the first type job, and the image formation related to the first type job is suspended, a possibility that an image forming apparatus is left without the image forming material being replenished is high.

If the first type job has been suspended, and in a case that other jobs are stored in the storage unit, and another image forming material necessary for image formation related to the other jobs has not run out, at least one job among the other jobs is executed.

On the other hand, the second type job is a job that does not include the recipient-specific information. A user who has inputted the second type job to the receiving unit, in many cases, goes to a location where the image forming apparatus has been installed in a short time, to take a sheet on which an image related to the job has been formed. Moreover, for a job such as a copy job that is executed while the user is being in front of the image forming apparatus, the user hardly moves away from the image forming apparatus until the execution of the job is completed. Consequently, in a case that the image forming material has run out during the execution of the second type job, and the image formation related to the second type job is suspended, a possibility that the image forming apparatus is left without the image forming material being replenished is low.

In the case that the second type job is suspended, even other jobs are stored in the storage unit, the other jobs are not executed. Therefore, the user who goes to the image forming apparatus or the user who is in front of the image forming apparatus can promptly complete the job (second type job) which the user has inputted to the receiving unit, by replenishing the image forming material. As a result, it is possible to prevent the user from waiting for the completion of job.

Consequently, it is possible to enable rational execution of a job, depending on the type of job that has been suspended.

The present teaching, can be realized not only by an embodiment of the image forming apparatus, but also by an embodiment of a method for executing job that is executed in the image forming apparatus, and by an embodiment of a non-transitory computer readable medium storing instructions for the image forming apparatus.

DESCRIPTION OF THE EMBODIMENTS

An embodiment of the present teaching will be described below in detail while referring to the accompanying diagrams.

<Configuration of MFP>

Figure 1:
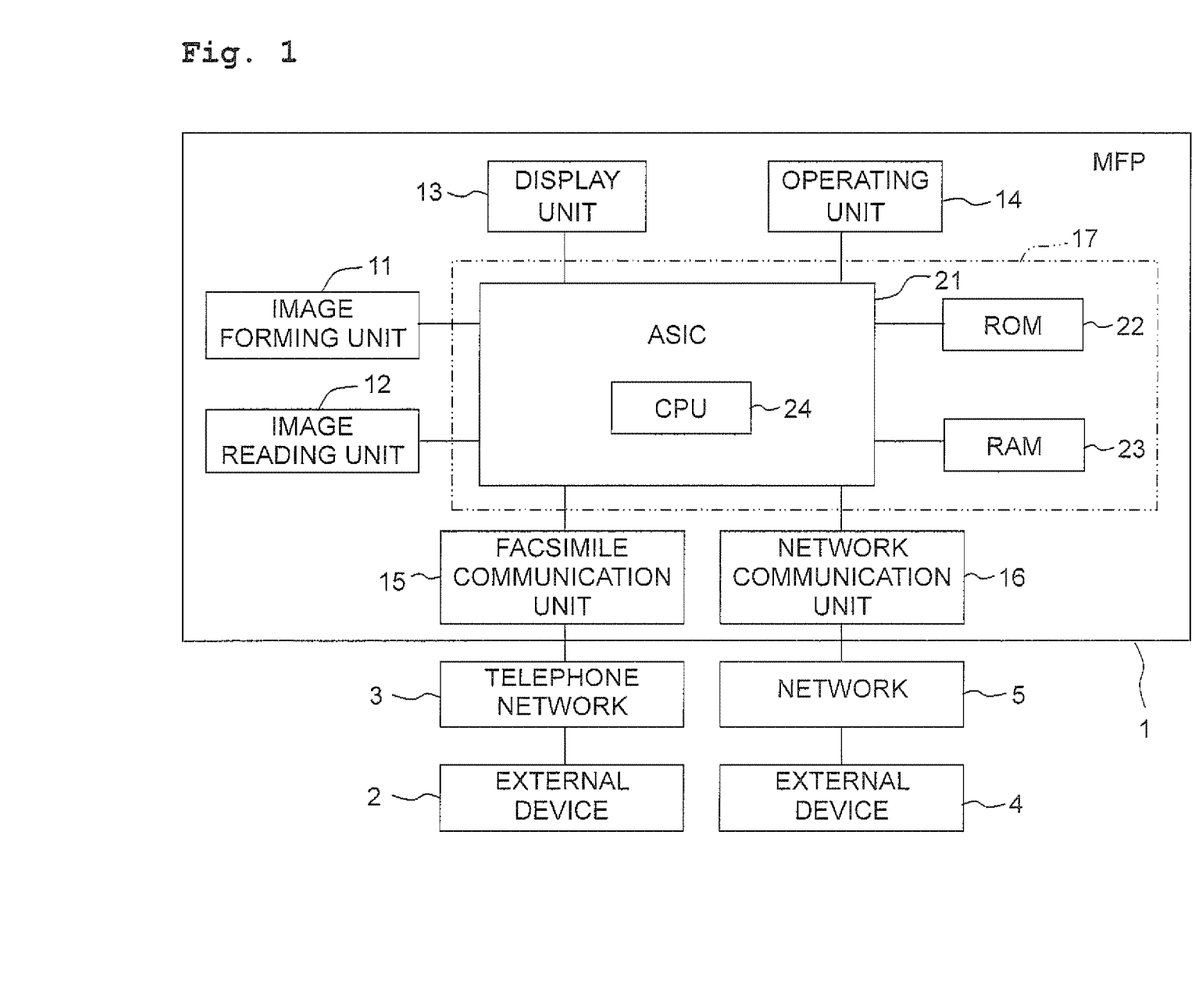
FIG. 1 is a block diagram depicting an electrical configuration of a multifunction peripheral (MFP) according to an embodiment of the present teaching.

An MFP 1 (an example of an image forming apparatus), as depicted in FIG. 1, is a multi-function peripheral having a printer function, a scanner function, and a facsimile function. Concretely, the MFP 1, for realizing various functions, includes an image forming unit 11, an image reading unit 12, a display unit 13, an operating unit 14 (an example of a receiving unit and an instruction unit), a facsimile communication unit 15 (an example of a receiving unit and a facsimile-job receiving unit), a network communication unit 16 (an example of a receiving unit and an image-formation job receiving unit), and a controller 17.

The image forming unit 11 executes image formation for a job that will be described later (forms an image related to the job on a sheet). A method for image formation may be an electrophotography or may be an ink-jet method. A sheet having an image formed thereon by the image forming unit 11 is discharged to a discharge tray that is not depicted in the diagram. In a case that a plurality of sheets is discharged to the discharge tray, the plurality of sheets is supported by the discharge tray in a state of being stacked.

The image reading unit 12 includes an image sensor and an Analog Front End (AFE). In the image reading unit 12, an image of a document on a contact glass is read by the image sensor, and an analog image signal is outputted from the image sensor, which in turn, is converted to digital image data by the AFE.

The display unit 13 includes a liquid-crystal display for example.

The operating unit 14 includes operation buttons (such as a start key, a numerical keypad, and a cursor key) to be operated for inputting various instructions.

The facsimile communication unit 15 includes circuits such as a circuit for facsimile communication with an external device 2 such as a facsimile apparatus, via a telephone line (telephone network) 3.

The network communication unit 16 includes circuits such as a circuit for network communication with an external device 4 such as a Personal Computer (PC), via a network 5 such as a Local Area Network (LAN) and the Internet.

The controller 17 includes an Application Specific Integrated Circuit (ASIC) 21, a Read Only Memory (ROM) 22, and a Random Access Memory (RAM) 23 (an example of a storage unit). The ASIC 21 has a Central Processing Unit (CPU) 24 (an example of a controller) which is built-in. The image forming unit 11, the image reading unit 12, the display unit 13, the operating unit 14, the facsimile communication unit 15, and the network communication unit 16 are electrically connected to the ASIC 21. The CPU 24 runs a computer program stored in the ROM 22, and controls the image forming unit 11, the image reading unit 12, the display unit 13, the facsimile communication unit 15, and the network communication unit 16, based on a signal input to the ASIC 21 from a unit such as the operating unit 14 and the facsimile communication unit 15. When the CPU 24 executes the control (computer program), the RAM 23 is used as a work area by the CPU 24. The RAM 23 may include a RAM having a backup function which enables to hold data by a supply of electric power from a backup power source built in the ASIC 21, or may include a non-volatile memory such as a Non Volatile Random Access Memory (NVRAM).

<Types of Jobs>

Figure 2:
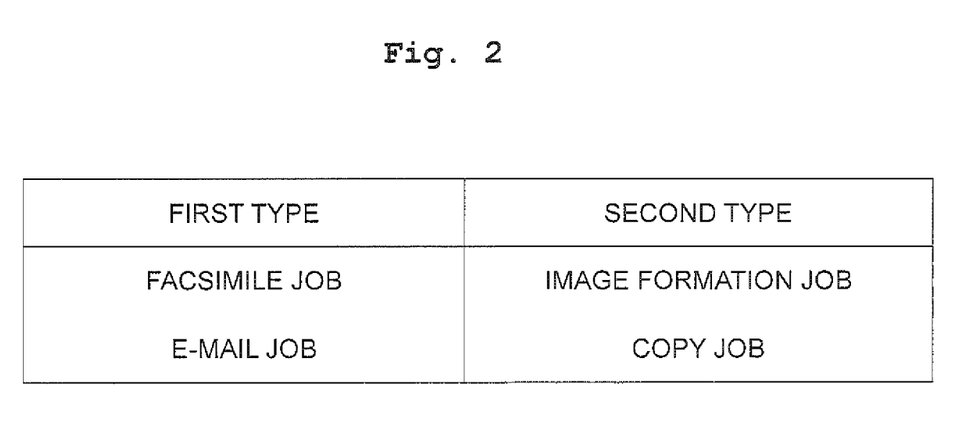
FIG. 2 is a table of jobs that are executable in the MFP.

Jobs that are executable in the MFP 1 are broadly divided into a first type job and a second type job.

The first type job includes recipient-specific information. The first type job includes a facsimile job and an electronic mail (e-mail) job. The recipient-specific information is information that specifies a recipient of a sheet on which an image related to a job is formed. Concretely, the recipient-specific information included in the facsimile job is a FAX (facsimile) number (a telephone number imparted in telephone-line subscription), and the recipient-specific information included in the e-mail job is an e-mail address of a user using the MFP 1 or an e-mail address that has been assigned to the MFP 1.

The facsimile job is sent from the external device 2 which is a sender, to the MFP 1 via the telephone network 3, and is received by the facsimile communication unit 15. Concretely, in the external device 2 which is a sender, for instance, a document is set on an Auto Document Feeder (ADF), and an operation panel which includes a numerical keypad etc. is operated, and after a FAX number of the MFP 1 is inputted, an instruction to carry out the facsimile transmission is given. As the instruction to carry out facsimile transmission is given, information (signal) of the FAX number that has been inputted is transmitted to a telephone exchange which is included in the telephone network, and a communication line is established between the MFP 1 and the external device 2. Moreover, an image of the document set in the ADF is read by the scanner function. After the communication line is established between the MFP 1 and the external device 2, data of the image of the document is transmitted from the external device 2 to the MFP 1. As all the image data transmitted from the external device 2 is received normally by the facsimile communication unit 15, a line between the MFP 1 and the external device 2 is disconnected, and reception of a facsimile job by the facsimile communication unit 15 is completed.

In the MFP 1, it is possible to switch to a mode, in which, after receiving a facsimile job by the facsimile communication unit 15, the facsimile job is executed without waiting for an instruction for execution by an operation of the operating unit 14, and to a mode in which, after receiving a facsimile job, the facsimile job is executed in response to an instruction for execution by an operation of the operating unit 14. Accordingly, facsimile jobs, according to a setting of mode, are subdivided into a job which does not require an instruction for execution (job not requiring instruction for execution), and a job which requires the instruction for execution (job requiring the instruction for execution). By execution of the facsimile job, image formation by the image forming unit 11 is carried out, and an image related to image data included in the facsimile job is formed on a sheet.

An e-mail job is sent from the external device 4 which is a sender, to the MFP 1 via the network 5, and is received by the network communication unit 16. Concretely, in the external device 4, which is a sender, for instance, a file (image data) is selected by an operation by a user, and after an e-mail address of a user to whom the file is to be sent is inputted, an instruction for sending the mail is given. In the MFP 1, the e-mail address (account) of the user has been set in advance. As an instruction for execution of sending the mail is given in the external device 4, a file is attached to mail data, and by Simple Mail Transfer Protocol (SMTP) for example, the mail data is transmitted to a receiving-mail server corresponding to the e-mail address of the user via a sending-mail server. The mail data and attached file received by the receiving-mail server are transferred from the receiving-mail server to the MFP 1. As the mail data and the attached file are received correctly by the network communication unit 16, reception of an e-mail job by the network communication unit 16 is completed. Instead of the e-mail address of the user, an e-mail address assigned to the MFP 1 may be set in advance.

In the MFP 1, it is possible to switch to a mode in which, after receiving an e-mail job by the network communication unit 16, the e-mail job is executed without waiting for an instruction for execution by an operation of the operating unit 14, and to a mode in which, after receiving an e-mail job, the e-mail job is executed in response to an instruction for execution by an operation of the operating unit 14. Accordingly, e-mail jobs, according to a setting of mode, are subdivided into a job which does not require an instruction for execution (job not requiring instruction for execution), and a job which requires an instruction for execution (job requiring the instruction for execution). By execution of the e-mail job, image formation by the image forming unit 11 is carried out, and an image related to image data included in the e-mail job is formed on a sheet.

The second type job is a job which does not include the recipient-specific information. The second type job includes an image formation job and a copy job.

The image formation job is sent from the external device 4 which is a sender, to the MFP 1 via the network 5, and is received by the network communication unit 16. In the external device 4 which is a sender, as an instruction for execution of the image formation job is given after a file (image data) to be subjected to image formation is selected by an operation by a user, the image formation job including the file selected by the user is transmitted to the MFP 1. By execution of the image formation job in the MFP 1, the image formation by the image forming unit is carried out, and an image related to the file included in the image formation job is formed on a sheet.

The copy job is received from the operating unit 14 by an operation by a user in the MFP 1. Concretely, a document is placed at a document mounting position set in the ADF provided to the MFP 1, or at a document mounting position set on a contact glass of the image reading unit 12. Thereafter, by an instruction for starting copy given by operation of the operating unit 14, the copy job is received by the operating unit 14. At the time of execution of the copy job, an image of the document is read by the image reading unit 12. Thereafter, image formation is executed by the image forming unit 11, and an image related to image data (in other words, an image of the document) achieved by image reading by the image reading unit 12 is formed on a sheet.

<Processing in a Case that a Job is Not Being Executed>

Figure 3:
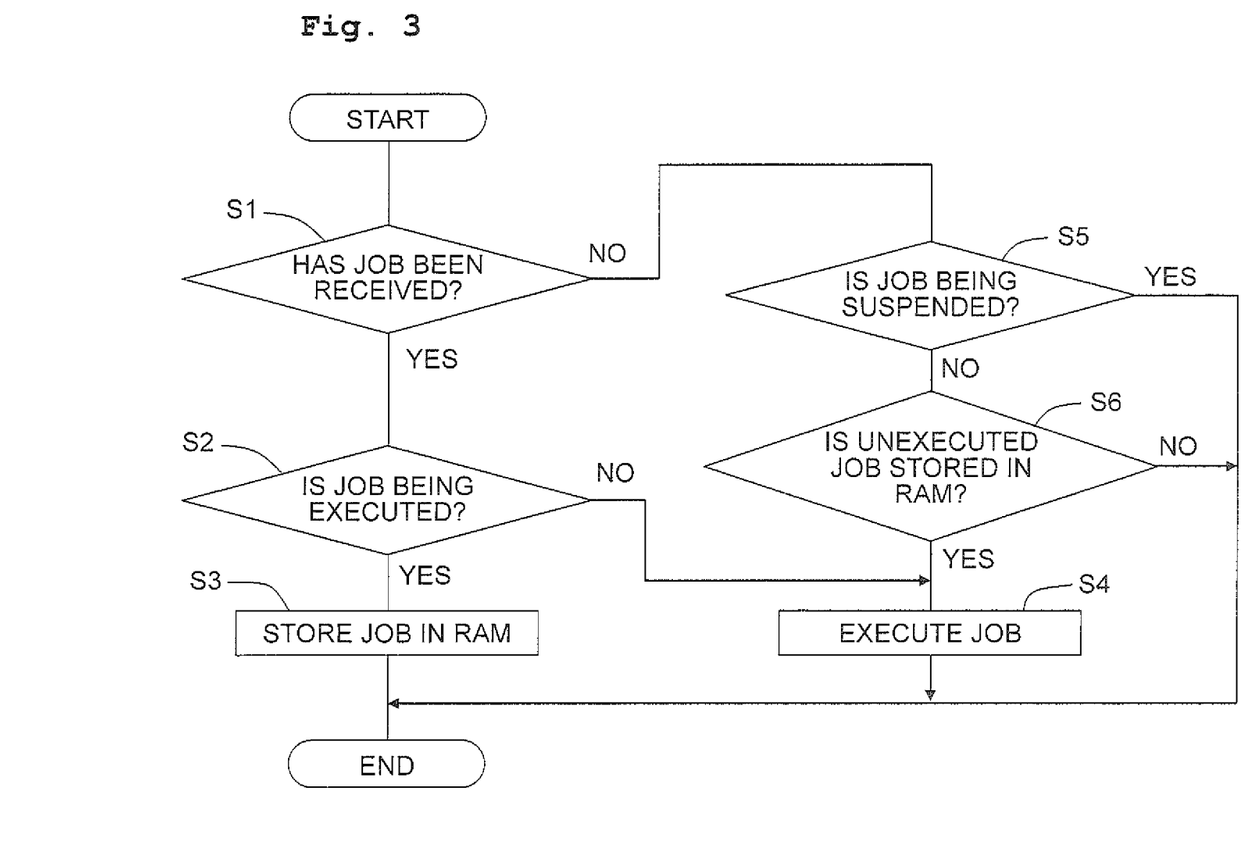
FIG. 3 is a flowchart illustrating a processing in a case that a job is not being executed.

In the MFP 1, a processing in a case that a job is not being executed depicted in FIG. 3 is executed by the CPU 24.

In the processing in the case that a job is not being executed, the CPU 24 determines whether a new job has been received by the operating unit 14, the facsimile communication unit 15, or the network communication unit 16 (step S1). For a new job such as a facsimile job and an e-mail job, in a case of the mode in which the job is executed in response to an instruction for execution by an operation of the operating unit 14 after receiving the job, the CPU 24 determines whether an instruction for execution has been given by an operation of the operating unit 14, in addition to whether a job has been received.

As the new job is received (YES at step S1), the CPU 24 determines whether a job that was received before is being executed (step S2).

In a case that the new job is received during execution of the job (YES at step S2), the CPU 24 stores the newly received job in the RAM 23 (step S3), and terminates the "processing in a case that a job is not being executed".

In a case that a new job is received when the job is not being executed (NO at step S2), the CPU 24 executes the newly received job (step S4), and terminates the "processing in a case that a job is not being executed".

On the other hand, in a case that no new job has been received (NO at step S1), the CPU 24 determines whether or not a job is being suspended (step S5). Suspending of job will be described later.

In a case that a job is being suspended (YES at step S5), the CPU 24 terminates the "processing in a case that a job is not being executed".

In a case that the job is not being suspended (NO at step S5), the CPU 24 determines whether a job which is to be executed has been stored in the RAM 23 (step S6).

In a case that a job which is to be executed has not been stored (NO at step S6), the CPU 24 terminates the "processing in a case that a job is not being executed".

Whereas, in a case that a job to be executed are stored in the RAM 23 (YES at step S6), the CPU 24 executes a job that has been stored earliest, from among the jobs that are stored in the RAM 23 (step S4), and terminates the "processing in a case that a job is not being executed".

<Processing in a Case that a Job is Being Executed>

Figure 4A:
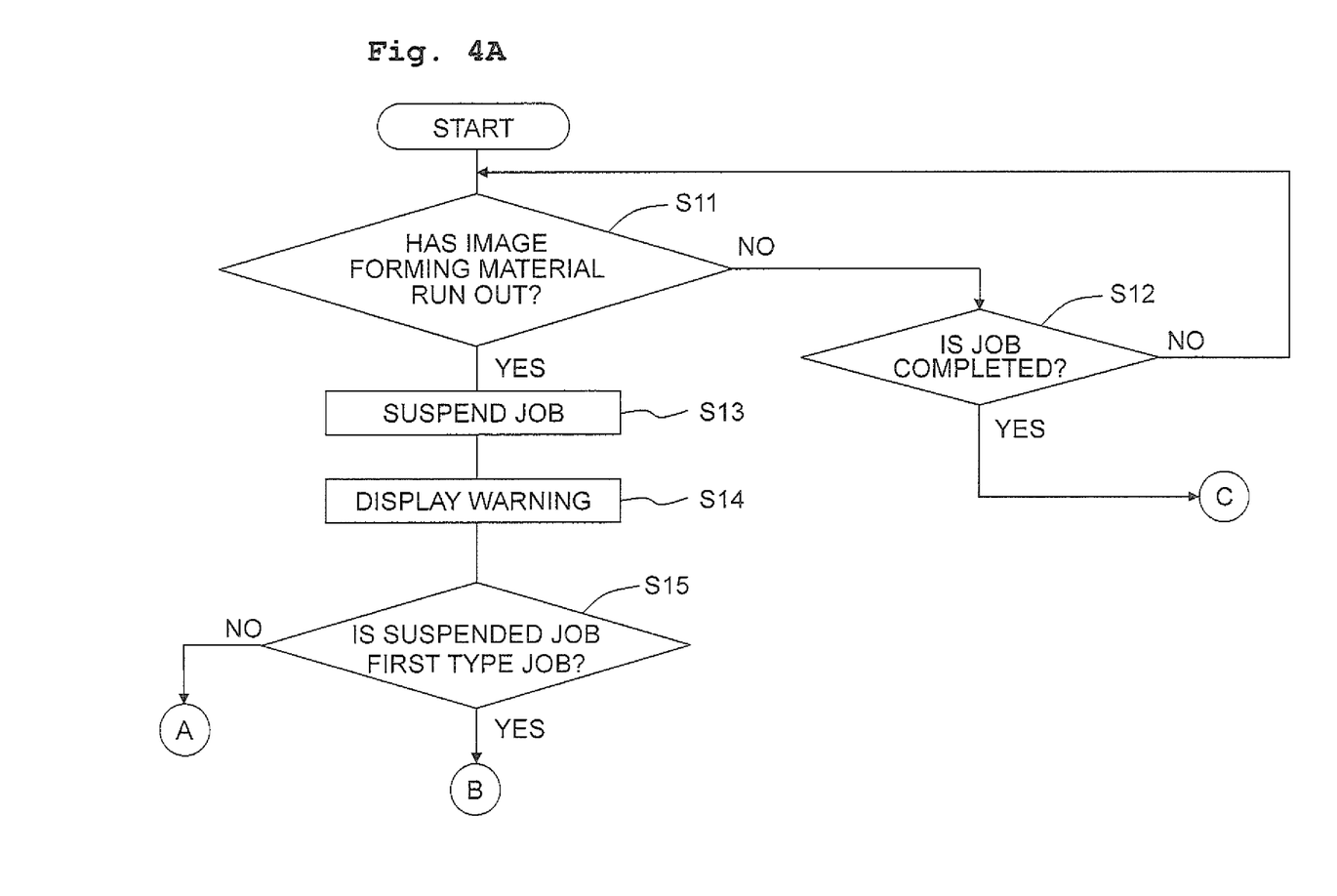
FIGS. 4A and 4B depict a flowchart illustrating a processing in a case that a job is being executed.
Figure 4B:
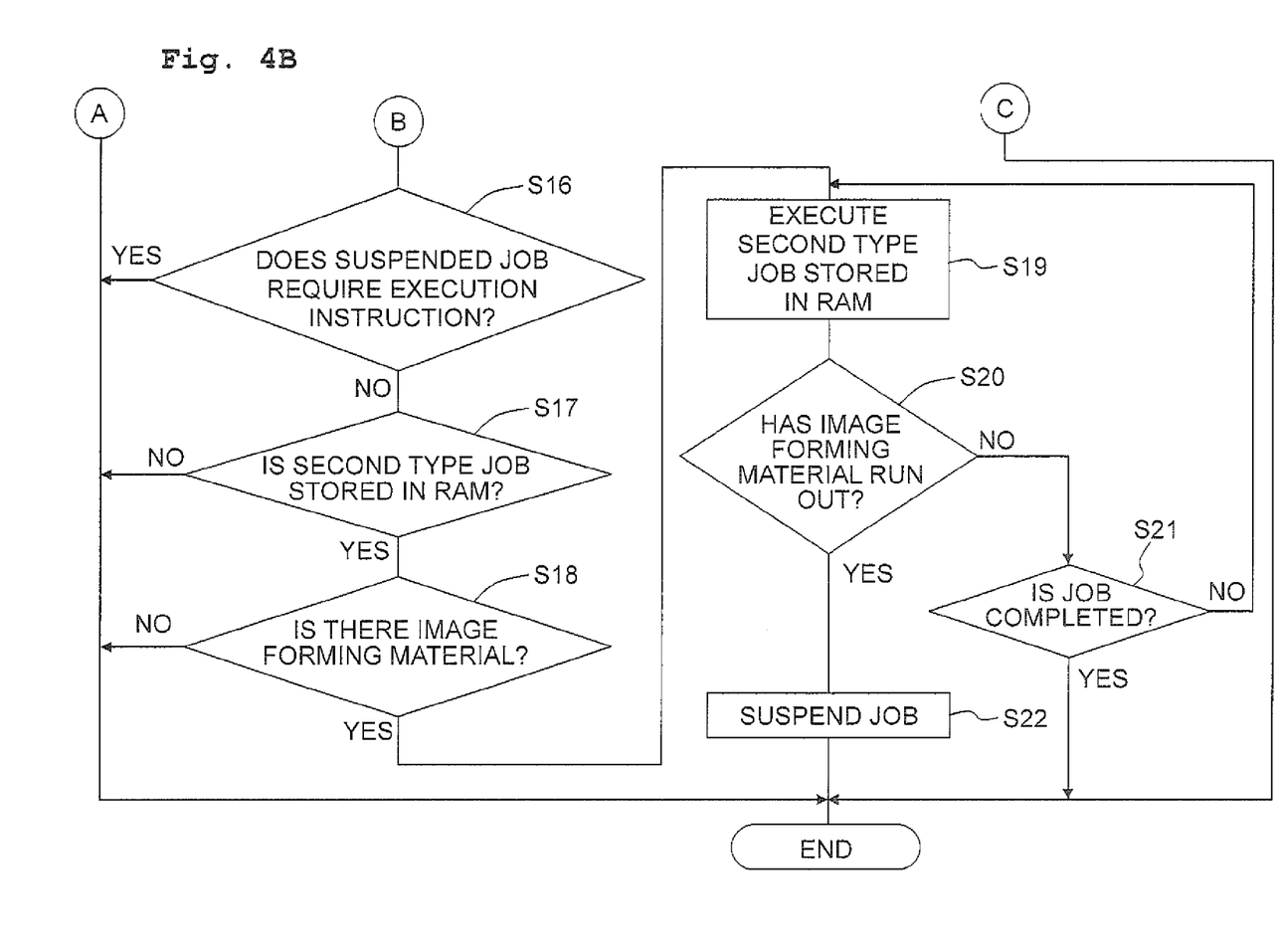

In the MFP 1, a "processing in a case in which, a job is being executed" depicted in FIG. 4 is executed by the CPU 24 during the execution of a job.

In the "processing in a case that a job is being executed", the CPU 24 determines whether an image forming material necessary for forming an image related to a job being executed has run out (step S11). In a case that the method of image formation by the image forming unit 11 is electrophotography, the image forming material includes sheets and toner. In a case that the method of image formation is ink-jet method, the image forming material includes sheets and ink. Whether sheets are remained is determined based on an output signal of a sensor that detects the sheets. Whether the toner or the ink is remained is determined based on an output signal of a sensor that detects the remaining amount of the toner or the ink.

In a case that the image forming material has not run out (NO at step S11), the CPU 24 determines whether the job that was being executed is completed (step s12).

When the image formation is completed without the image forming material necessary for forming an image related to the job being executed being run out, the CPU 24 determines that the job being executed is completed (YES at step S12), and terminates the "processing in a case that a job is being executed".

In a case that the CPU 24 has determined that the image forming material necessary for forming the image related to the job being executed has run out (YES at step S11) before the formation of the image related to the job being executed is completed, since the image formation is impossible, the CPU 24 suspends that job being executed (step S13).

Moreover, the CPU 24, by controlling the display unit 13, makes display a warning message indicating that the job is being suspended, on a display screen of the display unit 13 (step S14). The warning message is continued to be displayed on the display screen of the display unit 13 while the job is being suspended.

Moreover, the CPU 24 checks the type of the job that has been suspended. Further, the CPU 24 determines whether the job that has been suspended is a first type job (step S15). In other words, during the execution of the first type job, the CPU 24 determines whether the image forming material necessary for image formation by execution of the first type job has run out.

In a case that the job that has been suspended is a first type job (YES at step S15), the CPU 24 determines whether the job that has been suspended is a job which requires an instruction for execution (step S16).

In a case that the job that has been suspended is a first type job, and is not a job that requires an instruction for execution (NO at step S16), in other words, in a case that the job that has been suspended is a first type job, and is a job that does not require an instruction for execution, the CPU 24 determines whether a second type job has been stored in the RAM 23 (step s17).

In a case that a second type job has been stored in the RAM 23 (YES at step S17), the CPU 24 determines whether the image forming material necessary for forming an image related to the second type job stored earliest, from among second type jobs that have been stored in the RAM 23, is remained.

Sometimes, the image forming material necessary for formation of an image related to the second type job differs from the image forming material necessary for formation of an image related to the first type job. For example, in a case that the first type job is a facsimile job, sheets of size A4 are necessary as the image forming material related to the facsimile job. Whereas, in a case that the second type job is an image formation job, sometimes, sheets of size A3 larger than size A4 are required as the image forming material related to the image formation job.

In such manner, even in a case that the sheets of size A4 have run out during the execution of the facsimile job, and the facsimile job is suspended, if the image formation job that has been stored earliest in the RAM 23 is a job which requires the sheets of size A3 for image formation related to the image formation job, when the sheets of size A3 have not run out, it is possible to execute the image formation job.

In a case that the image forming material necessary for forming an image related to the second type job stored earliest, among second type job that have been stored in the RAM 23 (YES at step S18), is remained, the CPU 24 executes the second type job that has been stored earliest (step S19).

Thereafter, the CPU 24 determines whether the image forming material necessary for forming an image related to the second type job that is being executed has run out (step S20).

In a case that the image forming material has not run out (NO at step S20), the CPU 24 determines whether the second type job that is being executed is completed (step S21).

As the image formation is completed without the image forming material, which is necessary for image formation related to the second type job being executed, being run out, the CPU 24 determines that the second type job being executed is completed (YES at step S21), and terminates the "processing in a case that a job is being executed".

On the other hand, in a case that the CPU 24 has determined that the image forming material necessary for the image formation related to the second type job has run out before the image formation related to the second type job being executed is completed, (YES at step S20), the image formation is impossible. Thus, the CPU 24 suspends the job that is being executed (step S22), and terminates the "processing in a case that a job is being executed".

Moreover, the CPU 24, in a case that the CPU 24 determines that the suspended job is a first type job (NO at step S15), in other words, in a case that the suspended job is a second type job, or in a case that the suspended job is a first type job and requires an instruction for execution (NO at step S16), even if a second type job has been stored in the RAM 23, the CPU 24 terminates the "processing in a case that a job is being executed", without executing the second type job.

Moreover, even if the suspended job is a first type job and does not require an instruction for execution (NO at step S16), in a case that a second type job has not been stored in the RAM 23 (No at step S17), or that no image forming material, which is necessary for image forming related to the second type job that has been stored earliest, is remained (NO at step S18) even if second type jobs have been stored in the RAM 23 (YES at step S17), the execution of the second type job is impossible. Therefore, the CPU 24 terminates the "processing in a case that a job is being executed".

Regarding the suspended job, if the image forming material is replenished by a user, and the cause of suspension is eliminated, the suspension is released. Moreover, after the release of suspension, the "processing in a case that a job is not being executed" depicted in FIG. 3 is executed, and the job that has been released from suspension is executed (restarted).

[Action and Effect]

As described heretofore, the first type job includes the recipient-specific information that specifies recipient of a sheet on which an image related to the first type job is formed, and concretely, the first type job is a facsimile job or an e-mail job for example. The first type job, in many cases, is a job for which a user who uses the external devices 2 and 4 as a sender of the job and a user who is the recipient of the sheet on which an image related to the job is formed, are different. Consequently, in a case that the image forming material necessary for image formation related to the first type job has run out during execution of the job, and the image formation related to the first type job is suspended, a possibility that the MFP 1 is left without the image forming material being replenished is high.

In a case that a first type job was suspended, and a second type job has been stored in the RAM 23, and in a case that the image forming material necessary for image formation related to the second type job that has been stored has not run out, a second type job that has been stored earliest in the RAM 23 is executed out of the second type jobs.

On the other hand, the second type job does not include the recipient-specific information, and concretely, the second type job is an image formation job or a copy job. A user who has sent an image formation job from the external device 4 to the MFP 1, in many cases, goes to a location where the MFP has been installed at an appropriate timing within a short time, to take a sheet on which an image related to the image formation job is formed. Moreover, for a copy job that is executed while the user is staying in front of the MFP 1, the user hardly moves away from the MFP 1 until the execution of the job is completed. Consequently, in a case that the image forming material has run out during the execution of a second type job, and the image formation related to the second type job is suspended, a possibility that the MFP 1 is left without the image forming material being replenished is low.

In a case that a second type job is suspended, even if another second type job is stored in the RAM 23, the another second type job is not executed. Therefore, the user is able to complete the second type job promptly by replenishing the image forming material. As a result, it is possible to prevent the user from waiting for the completion of the second type job.

Moreover, if a first type job requires an instruction for execution, it is necessary for the user to give an instruction for execution by an operation of the operating unit 14. Therefore a possibility that the user who has carried out that operation is in front of the MFP 1 during the execution of the first type job requiring the instruction for execution is high. Consequently, in a case that the image forming material has run out during the execution of the first type job requiring instruction for execution, and image formation related to the first type job is suspended, a possibility that the MFP 1 is left without the image forming material being replenished is low.

Even if the first type job was suspended, in a case that the first type job requires an instruction for execution, another second type job is not executed even if the another second type job has been stored in the RAM 23. Therefore, the user is able to complete the first type job that requires an instruction for execution promptly by replenishing the image forming material. As a result, it is possible to prevent the user from waiting for the completion of the first type job.

Thus, depending on the type of job that was suspended, it is possible to execute the job rationally.

For instance, even if sheets of size A4 have run out during execution of a facsimile job that does not require an instruction for execution and the facsimile job is suspended, in a case that an image formation job that has been stored earliest in the RAM 23 is a job which requires sheets of size A3 for image formation related to the image formation job, the image formation job is executed if the sheets of size A3 have not run out. Accordingly, even if the sheets of size A3 having images related to the image formation job formed thereon are piled up on the sheets of size A4 having images related to the facsimile job formed thereon, in a paper discharge tray not depicted in the diagram, it is possible to sort easily the sheets related to the facsimile job and the sheets related to the image formation job since the sizes of sheets differ.

Moreover, in a case that a large number of jobs is suspended, if the large number of jobs suspended is executed one by one, sheets related to the large number of jobs are piled up in the discharge tray. Therefore, sorting out the sheets related to the large number of jobs is a troublesome work. In the MFP 1, if a first type job is suspended, and furthermore, a second type job is suspended, even if another second type job has been stored in the RAM 23, the another second type job is not executed newly. Accordingly, it is possible to prevent from getting in a state in which the large number of jobs is suspended, and to prevent an occurrence of the work of sorting out the sheets related to the large number of jobs.

Moreover, while the job is suspended, a warning message indicating that the job is in suspension is displayed on the display screen of the display unit 13. Accordingly, it is possible to caution (to inform) the user that the job is in suspension.

Modified Examples

The embodiment of the present teaching has been described heretofore, and it is possible to put the present teaching in effect for other embodiments.

For instance, in the aforementioned embodiment, an arrangement in which, in the case that the first type job that does not require the instruction for execution was suspended, and in the case that no image forming material which is necessary for image forming related to the second type job that was stored earliest in the RAM 23 is remained, another second job stored in the RAM 23 is not executed, was adopted. However, in a case that no image forming material which is necessary for image forming related to the second type job that was stored earliest in the RAM 23 is remained, and in a case that image forming material, which is necessary for image formation for another second type job different from the second type job that was stored earliest, is remained, the another second type job may be executed.

Moreover, an arrangement was made such that, during the suspension of job, the warning message indicating that the job is being suspended is displayed on the display screen of the display unit 13. However, during execution of a second type job after the first type job has been suspended, the display of the warning message may have been deleted from the display screen of the display unit 13. In this case, it is preferable that after the completion of the second type job, the warning message is displayed again on the display screen of the display unit 13.

Moreover, in the aforementioned embodiment, an arrangement, in which the fax number that is to be used for facsimile communication by the MFP 1 is included in a facsimile job as the recipient-specific information, was described. However, the recipient-specific information included in a facsimile job may be image information indicating a destination of facsimile. In other words, in a normal facsimile job, an image indicating as to with which user the facsimile communication was made (for example an image formed at a header portion of a sheet) is included in the job, and this image is also deemed as the recipient-specific information. In other words, a normal facsimile job is deemed as a first type job.

Moreover, in the aforementioned embodiment, a case in which sheets and toner or sheets and ink are used as an image forming material was described. However, only sheets or only toner or ink may be used as the image forming material.

Moreover, in the aforementioned embodiment, a case, in which the first type job is a facsimile job that requires a sheet of size A4 and second type job is an image formation job that requires a sheet of size A3, was exemplified. However, the first type job may be a facsimile job that requires sheets of size A4 or sheets larger than A4, and the second type job may be an image formation job that requires sheets of size smaller than A4.

Moreover, in the aforementioned embodiment, a case, in which the CPU 24 executes each processing, was described. However, the ASIC 21 may include a plurality of CPUs, and the plurality of CPUs may execute each processing combinedly.

Apart from the abovementioned modified examples, it is possible to make various design modifications in the aforementioned arrangement within the scope of the claims.

What is claimed is:

1. An image forming apparatus comprising:
    a receiving unit configured to receive jobs;
    an image forming unit configured to form an image on a sheet;
    a storage unit; and
    a controller,
        wherein each of the jobs to be received by the receiving unit is a first type job or a second type job, the first type job including recipient-specific information that specifies a recipient of a sheet on which an image related to the first type job is formed, the second type job not including the recipient-specific information,
        in a case that a job is received by the receiving unit while not executing any job, the controller is configured to control the image forming unit to form an image related to the job on a sheet,
        in a case that another job is received by the receiving unit while executing the job, the controller is configured to store the another job in the storage unit,
        in a case that the controller determines that an image forming material necessary for image formation related to the first type job has run out while executing the first type job, the controller is configured to control the image forming unit to suspend image formation related to the first type job, and in a case that other jobs are stored in the storage unit and that the controller determines that another image forming material necessary for image formation related to the other jobs has not run out, the controller is configured to, based on the job being a first type job including recipient-specific information, control the image forming unit to form an image, which is related to at least one job among the other jobs, on a sheet, and
        in a case that the controller determines that an image forming material necessary for image formation related to the second type job has run out while executing the second type job, the controller is configured to, based on the job being a second type job not including recipient-specific information, control the image forming unit to suspend image formation related to the second type job, and not to execute the other jobs even if the other jobs are stored in the storage unit.

2. The image forming apparatus according to claim 1, wherein the receiving unit includes:
    a facsimile job receiving unit connected to a telephone line, and configured to receive a facsimile job by communication via the telephone line; and
    an image formation job receiving unit connected to a network other than the telephone line, and configured to receive an image-formation job by communication via the network,
    the facsimile job is the first type job, and
    the image formation job is the second type job.

3. The image forming apparatus according to claim 2, further comprising an instruction unit configured to give an instruction for the controller to execute the jobs received by the receiving unit,
    wherein in a case that the facsimile job requires the instruction by the instruction unit, and that the controller determines that an image forming material necessary for image formation related to the facsimile job has run out while executing the facsimile job, the controller is configured to control the image forming unit to suspend the image formation related to the facsimile job, and not to execute the other jobs even if the other jobs are stored in the storage unit.

4. The image forming apparatus according to claim 1, wherein in a case that the controller determines that the other jobs are stored in the storage unit after the image formation related to the first type job has been suspended, the controller is configured to determine whether each of the other jobs is the first type job or the second type job, and
    in a case that at least one second type job is stored in the storage unit, and that the controller determines that the image forming material necessary for the image formation related to the at least one second type job has not run out, the controller is configured to control the image forming unit to form an image related to the at least one second type job on a sheet.

5. The image forming apparatus according to claim 1, wherein a size of a sheet to be used for the first type job is smaller than a size of a sheet to be used for the second type job.

6. The image forming apparatus according to claim 1, wherein in a case that the controller determines that the image forming material necessary for image formation related to the at least one job has run out while executing the at least one job, the controller is configured to control the image forming unit to suspend the image formation related to the at least one job, and not to execute remaining jobs other than the at least one job even if the remaining jobs are stored in the storage unit.

7. The image forming apparatus according to claim 1, further comprising a display unit,
    wherein the controller is configured to control the display unit to display a warning while the formation of the image related to the first type job is suspended.

8. A method for executing a job by a controller of an image forming apparatus, which includes: a receiving unit configured to receive jobs; an image forming unit configured to form an image on a sheet; a storage unit; and the controller, wherein each of the jobs to be received by the receiving unit is a first type job or a second type job, the first type job including recipient-specific information that specifies a recipient of a sheet on which an image related to the first type job is formed, the second type job not including the recipient-specific information, the method comprising:
    in a case that a job is received by the receiving unit while not executing any job, controlling the image forming unit to form an image related to the job on a sheet, in a case that another job is received by the receiving unit while executing the job, storing the another job in the storage unit, in a case that the controller determines that an image forming material necessary for image formation related to the first type job has run out while executing the first type job, controlling the image forming unit to suspend image formation related to the first type job, and in a case that other jobs are stored in the storage unit and that the controller determines that another image forming material necessary for image formation related to the other jobs has not run out, based on the job being a first type job including recipient-specific information, controlling the image forming unit to form an image, which is related to at least one job among the other jobs, on a sheet, and in a case that the controller determines that an image forming material necessary for image formation related to the second type job has run out while executing the second type job, based on the job being a second type job not including recipient-specific information, controlling the image forming unit to suspend image formation related to the second type job, and not to execute the other jobs even if the other jobs are stored in the storage unit.

9. A non-transitory computer-readable medium storing computer-executable instructions for a controller of an image forming apparatus, which includes: a receiving unit configured to receive jobs; an image forming unit configured to form an image on a sheet; a storage unit; and the controller, wherein each of the jobs to be received by the receiving unit is a first type job or a second type job, the first type job including recipient-specific information that specifies a recipient of a sheet on which an image related to the first type job is formed, the second type job not including the recipient-specific information, the instructions causing the controller of the image forming apparatus to:

in a case that a job is received by the receiving unit while not executing any job, control the image forming unit to form an image related to the job on a sheet, in a case that another job is received by the receiving unit while executing the job, store the another job in the storage unit, in a case that the controller determines that an image forming material necessary for image formation related to the first type job has run out while executing the first type job, control the image forming unit to suspend image formation related to the first type job, and in a case that other jobs are stored in the storage unit and that the controller determines that another image forming material necessary for image formation related to the other jobs has not run out, based on the job being a first type job including recipient-specific information, control the image forming unit to form an image, which is related to at least one job among the other jobs, on a sheet, and in a case that the controller determines that an image forming material necessary for image formation related to the second type job has run out while executing the second type job, based on the job being a second type job not including recipient-specific information, control the image forming unit to suspend image formation related to the second type job, and not to execute the other jobs even if the other jobs are stored in the storage unit.

\* \* \* \* \*